No. 840,116. PATENTED JAN. 1, 1907.
J. DEGEN.
MEANS FOR BALANCING CENTRIFUGAL PUMPS.
APPLICATION FILED JULY 6, 1905.

8 SHEETS—SHEET 1.

Witnesses:
John H. Lynch.
Fred W. Barnacle.

Inventor:
Julius Degen.
By his Attorney:
F. H. Richards.

No. 840,116. PATENTED JAN. 1, 1907.
J. DEGEN.
MEANS FOR BALANCING CENTRIFUGAL PUMPS.
APPLICATION FILED JULY 6, 1905.

8 SHEETS—SHEET 2.

Witnesses:
John N. Lynch
Fred W. Barnacle

Inventor:
Julius Degen.
By his Attorney:
F. H. Richards.

No. 840,116. PATENTED JAN. 1, 1907.
J. DEGEN.
MEANS FOR BALANCING CENTRIFUGAL PUMPS.
APPLICATION FILED JULY 6, 1905.
8 SHEETS—SHEET 4.
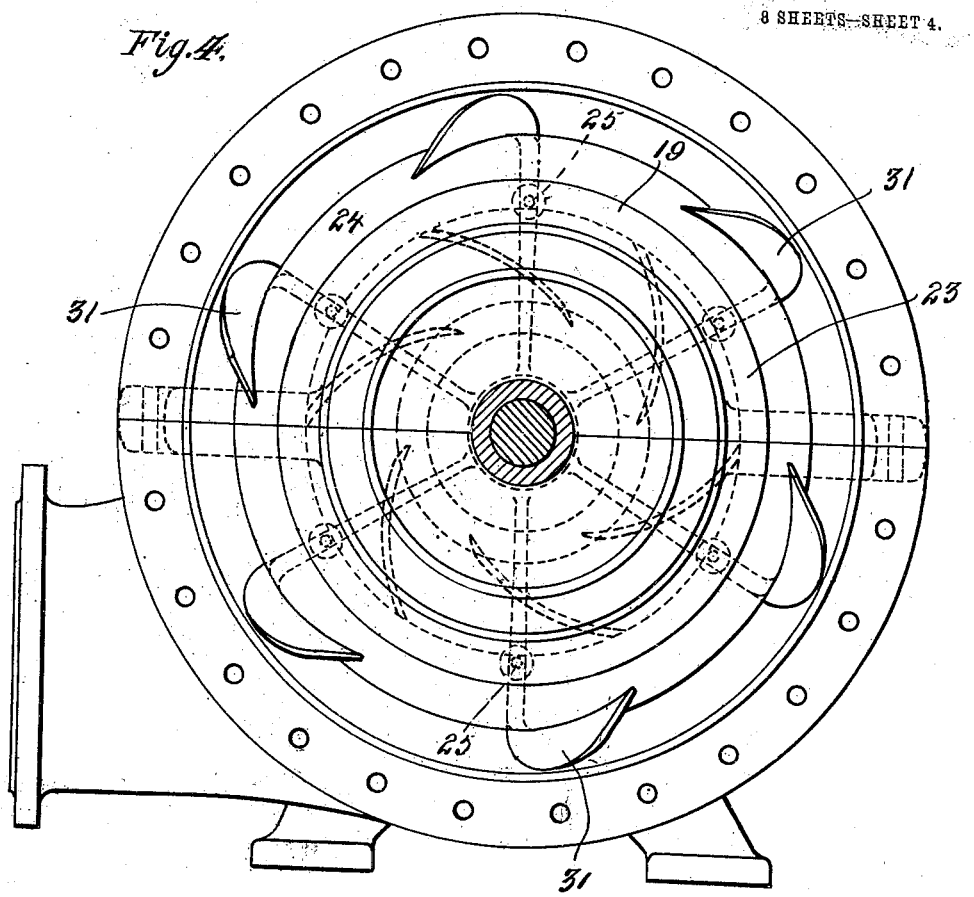
Fig. 4.
Fig. 5.
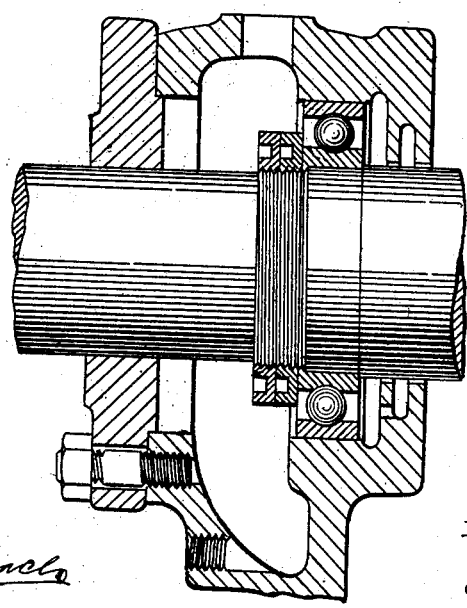
Witnesses:
John H. Lynch.
Fred W. Barnacle.
Inventor:
Julius Degen.
By his Attorney:
F. H. Richards.

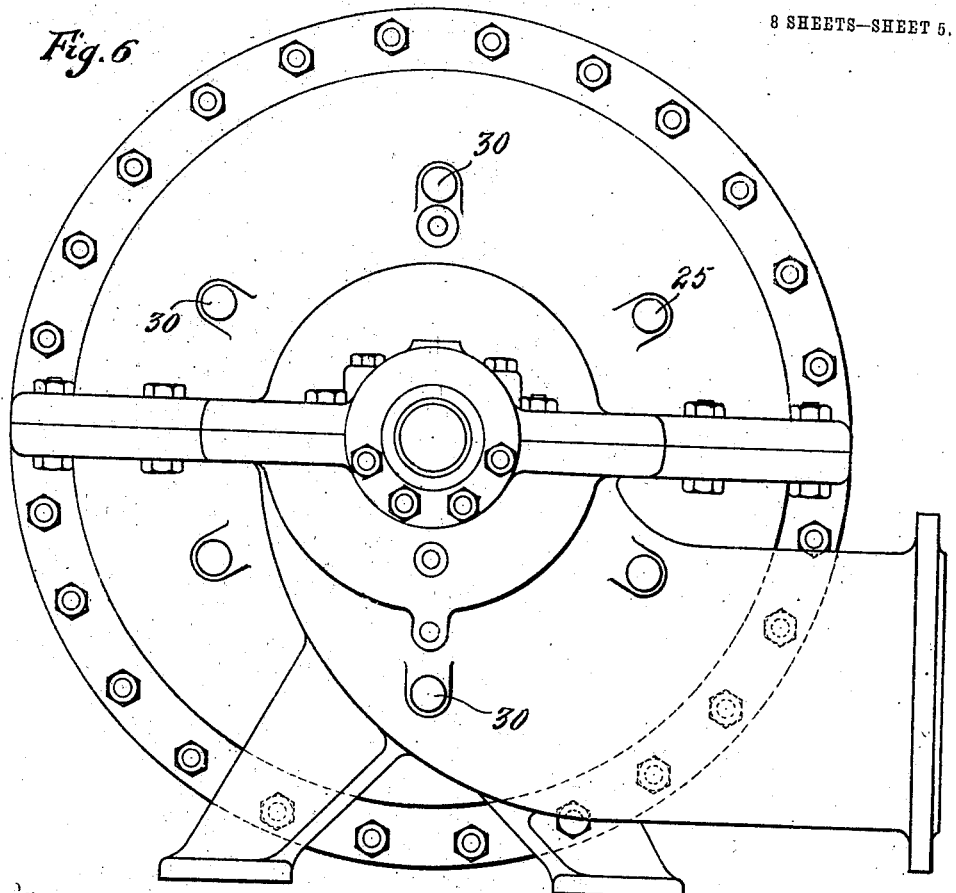
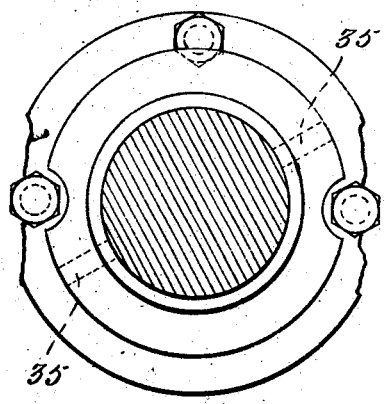
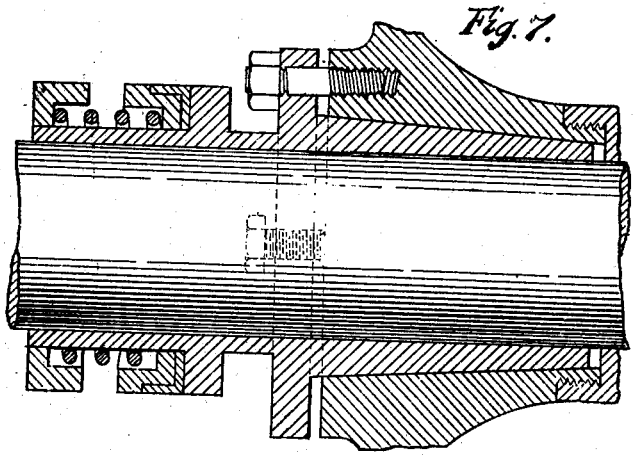

No. 840,116. PATENTED JAN. 1, 1907.
J. DEGEN.
MEANS FOR BALANCING CENTRIFUGAL PUMPS.
APPLICATION FILED JULY 6, 1905.

9 SHEETS—SHEET 6.

Witnesses:
John H. Lynch
Fred W. Barnes

Inventor:
Julius Degen.
By his attorney:
F. H. Richards.

No. 840,116. PATENTED JAN. 1, 1907.
J. DEGEN.
MEANS FOR BALANCING CENTRIFUGAL PUMPS.
APPLICATION FILED JULY 6, 1905.
8 SHEETS—SHEET 7.
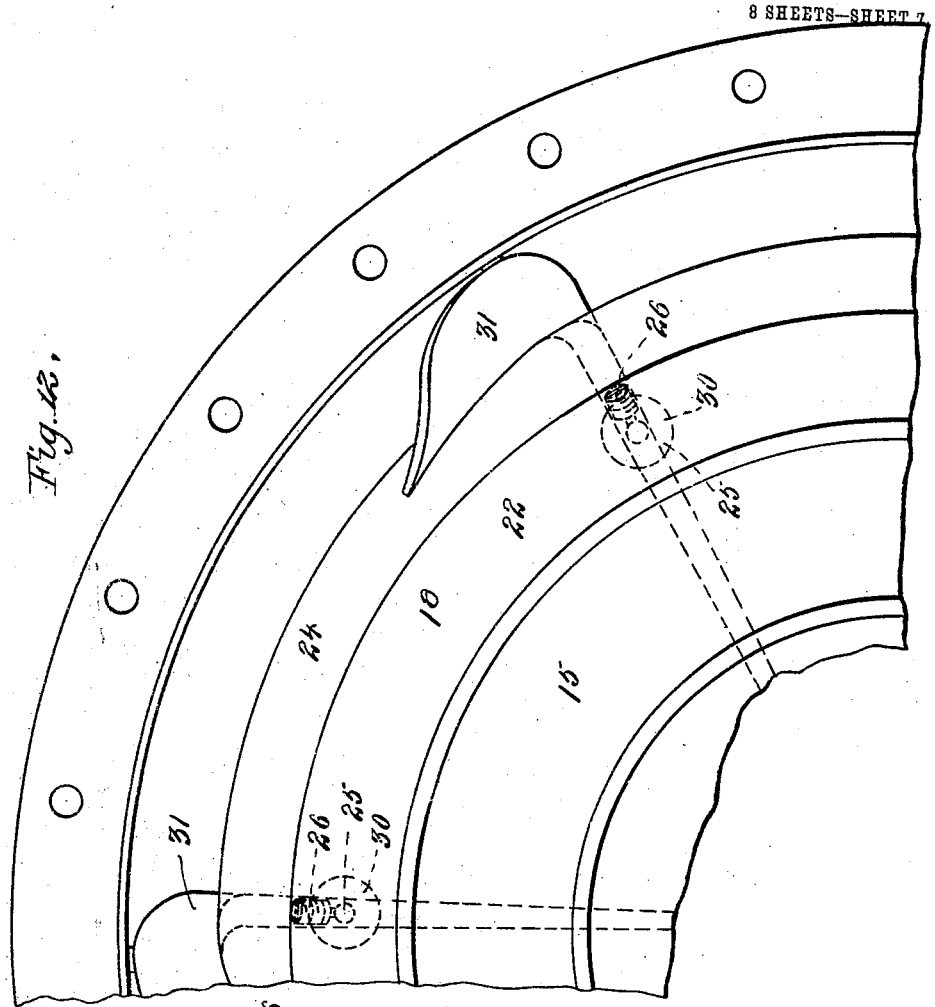
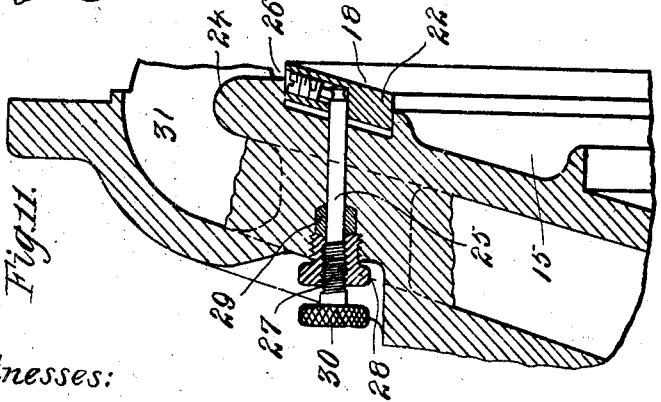
Witnesses:
John H. Lynch.
Inventor
Julius Degen.
By his Attorney:
F. H. Richards.

No. 840,116. PATENTED JAN. 1, 1907.
J. DEGEN.
MEANS FOR BALANCING CENTRIFUGAL PUMPS.
APPLICATION FILED JULY 6, 1905.
8 SHEETS—SHEET 8.
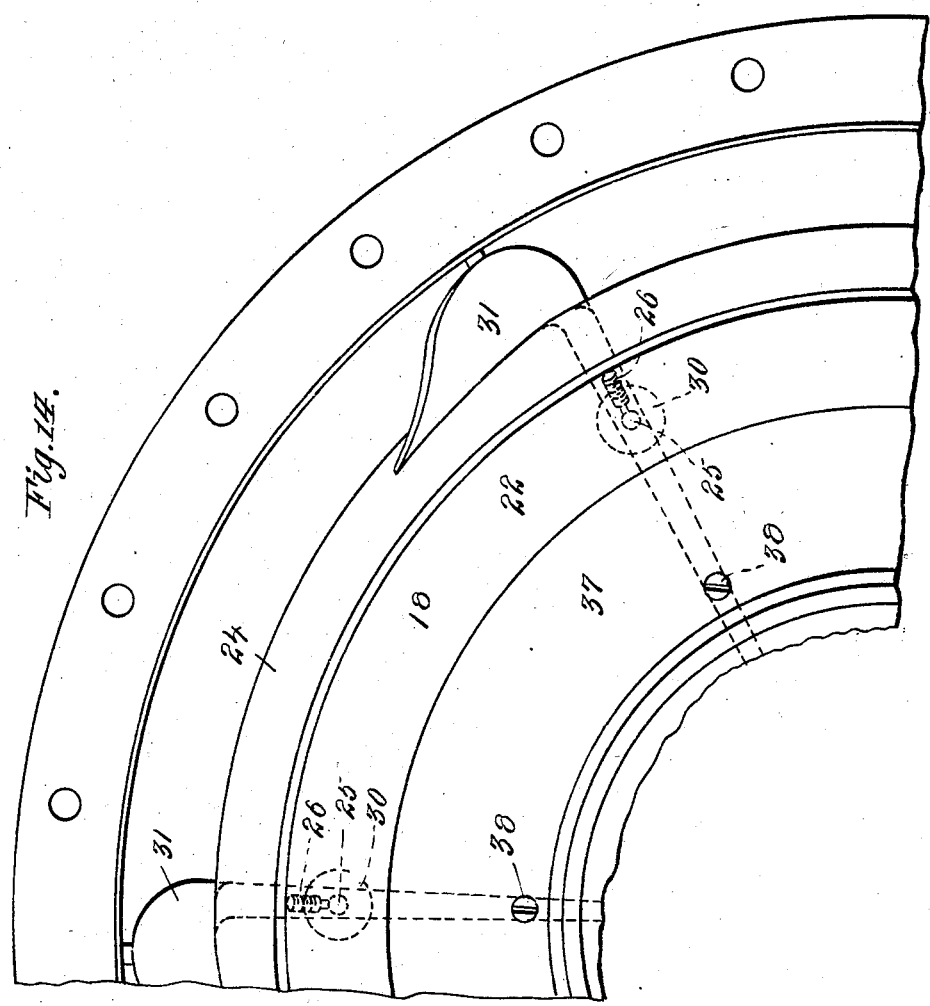
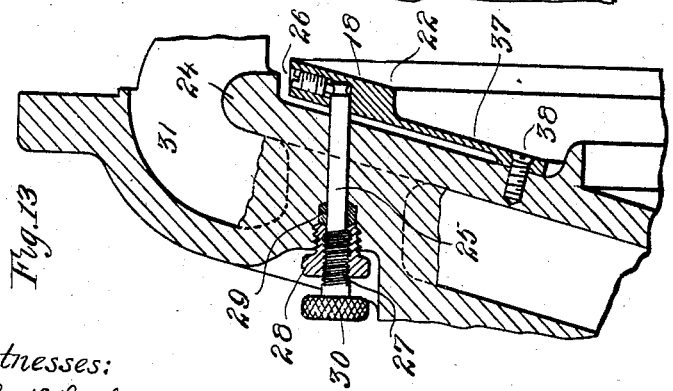
Witnesses:
John H. Lynch.
Inventor:
Julius Degen.
By his Attorney:
F. A. Richards.

UNITED STATES PATENT OFFICE.

JULIUS DEGEN, OF TRENTON, NEW JERSEY, ASSIGNOR, BY MESNE ASSIGNMENTS, TO LEA-DEGEN PUMP COMPANY, OF TRENTON, NEW JERSEY, A CORPORATION OF NEW JERSEY.

MEANS FOR BALANCING CENTRIFUGAL PUMPS.

No. 840,116.     Specification of Letters Patent.     Patented Jan. 1, 1907.

Application filed July 6, 1905. Serial No. 268,399.

*To all whom it may concern:*

Be it known that I, JULIUS DEGEN, a citizen of the Republic of Switzerland, residing in Trenton, in the county of Mercer and State of New Jersey, have invented certain new and useful Improvements in Means for Balancing Centrifugal Pumps, of which the following is a specification, reference being had to the accompanying drawings, in which—

Figure 1:
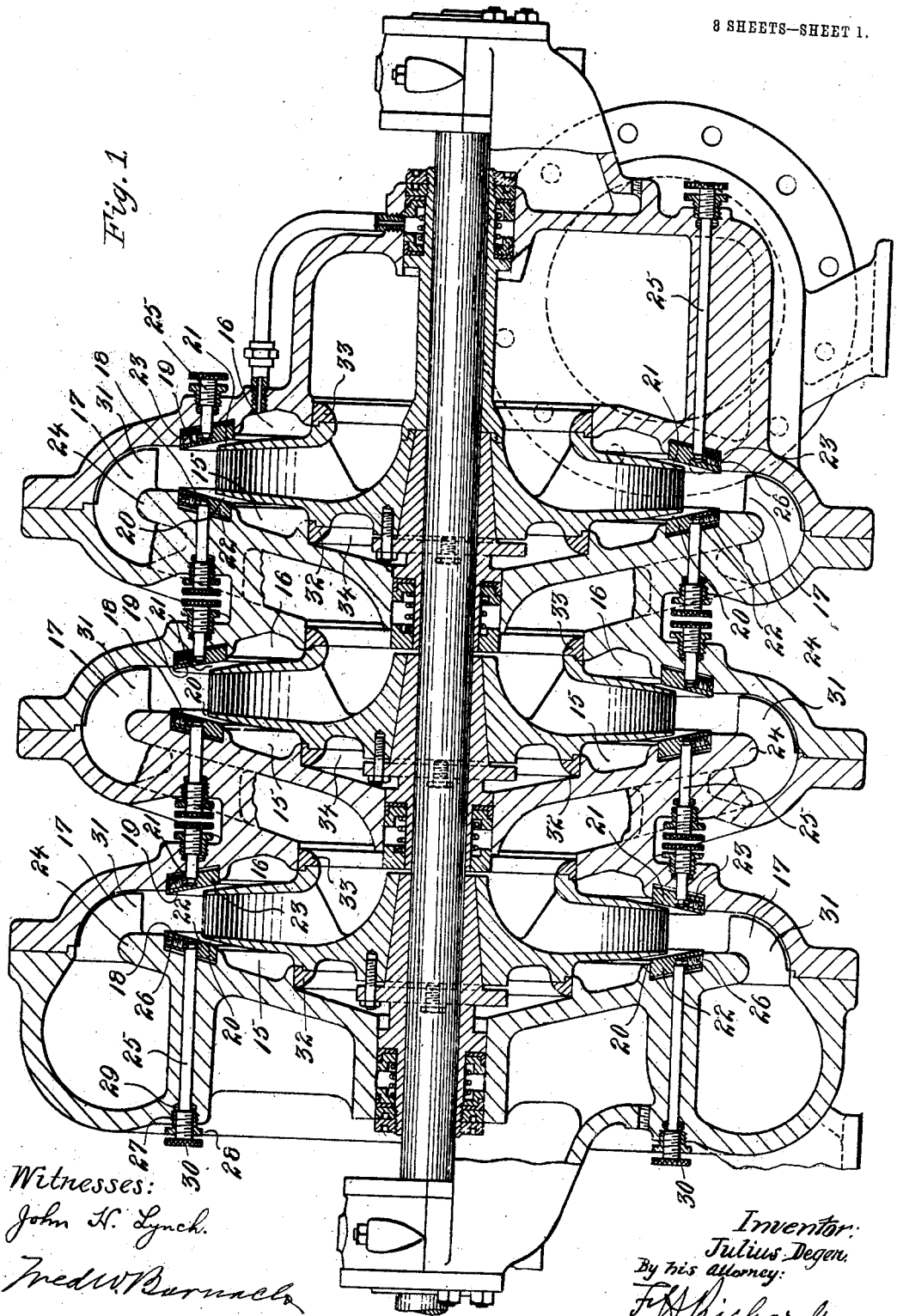
Figure 2:
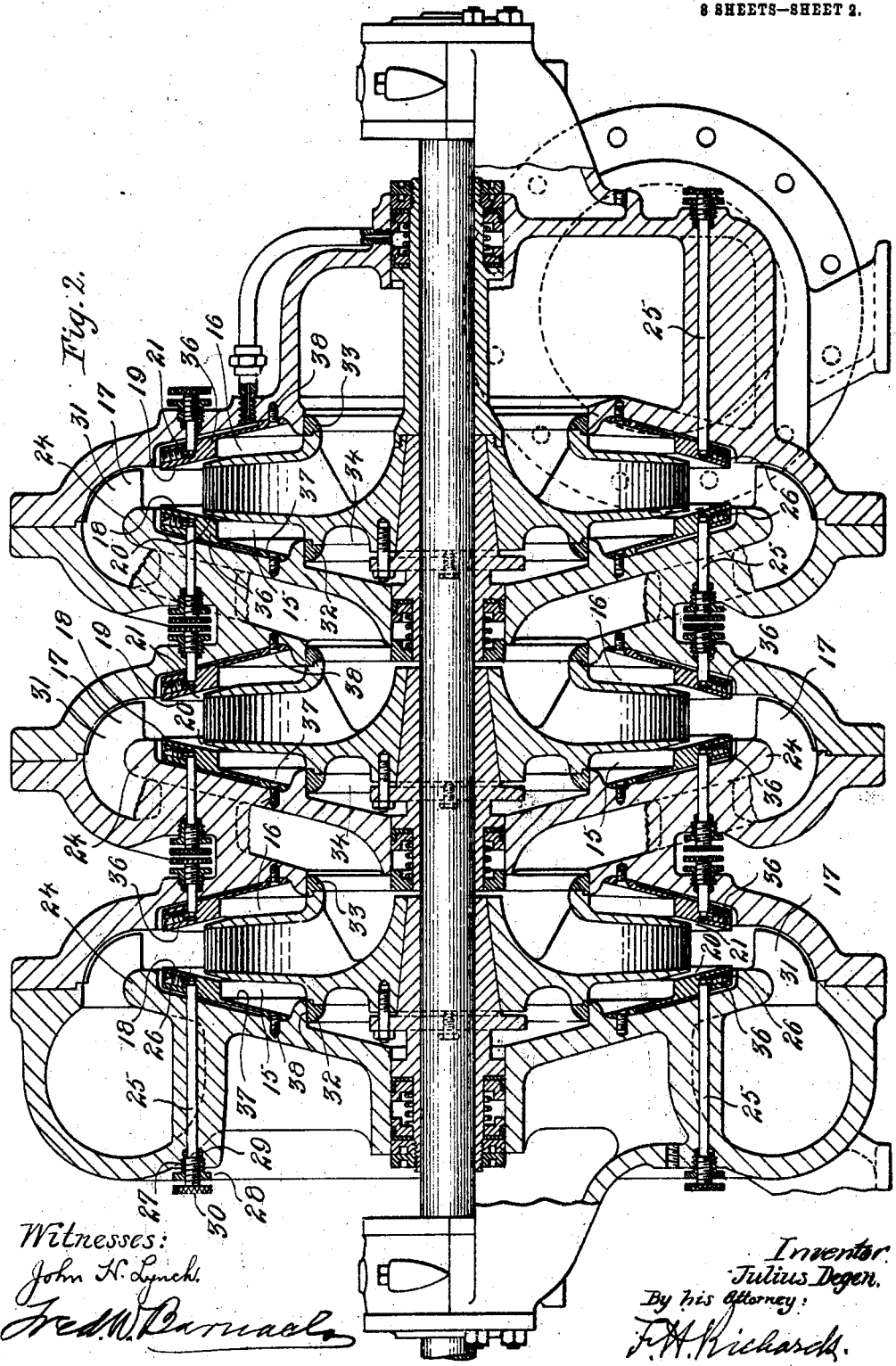
Figure 3:
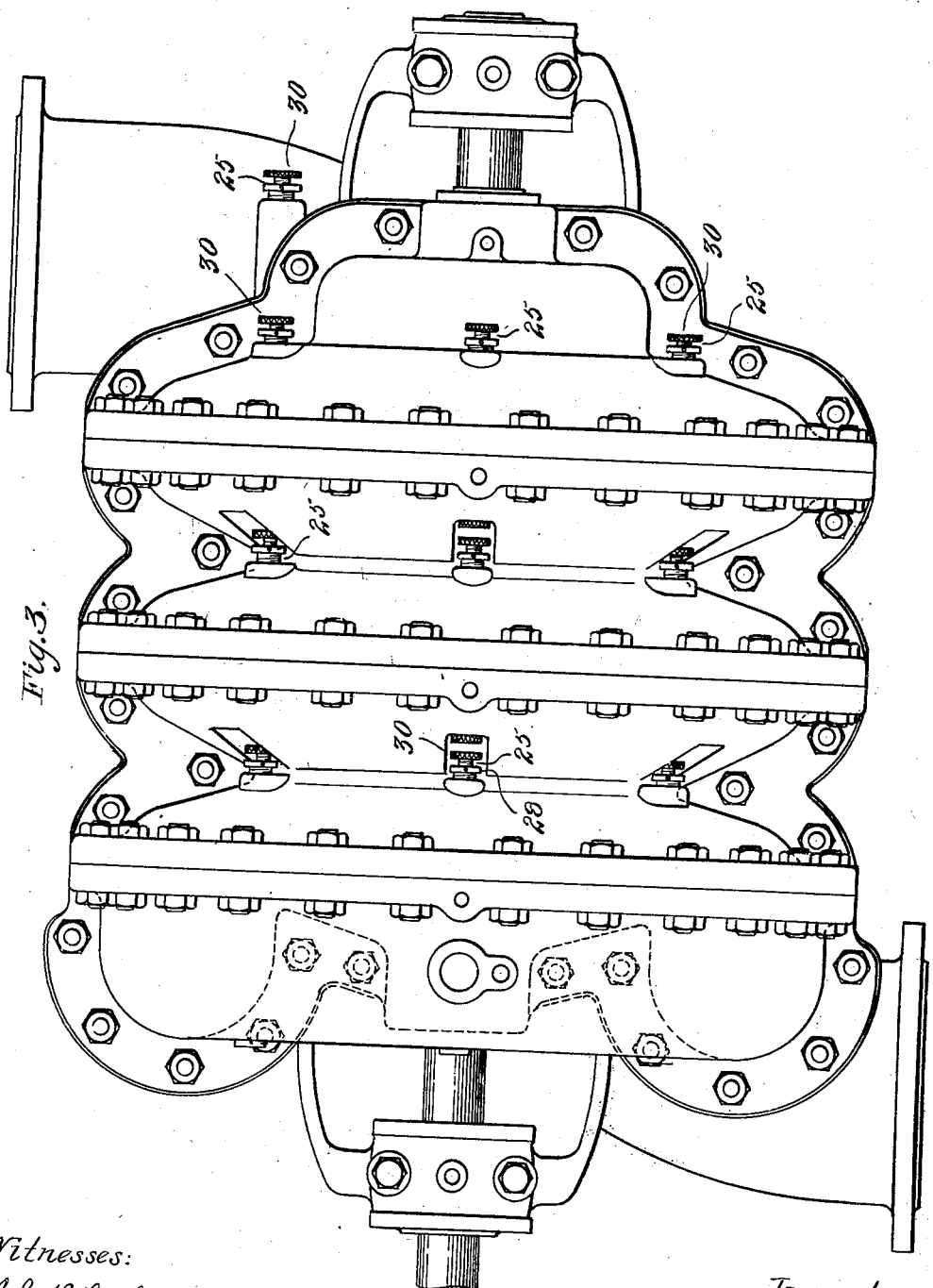
Figure 9:
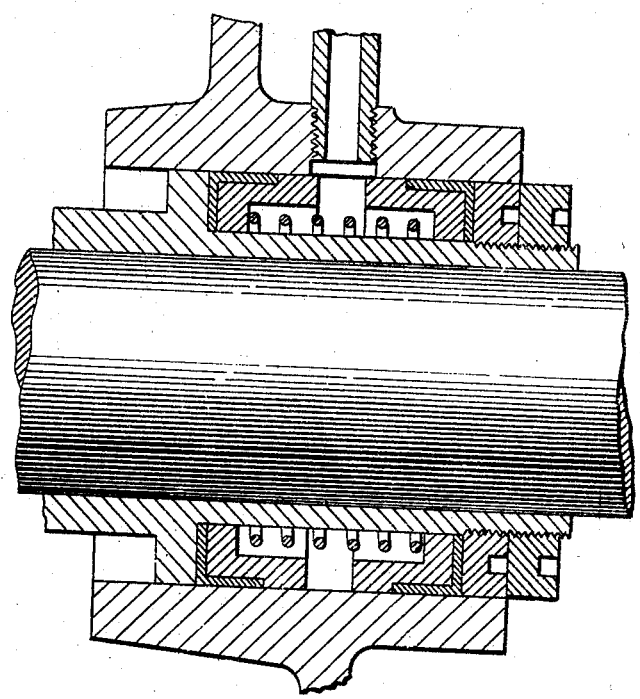
Figure 10:
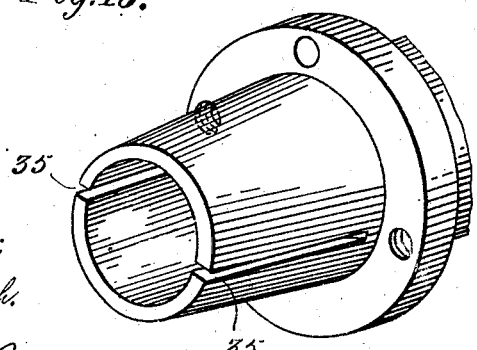

Figure 1 is a vertical longitudinal sectional view of a centrifugal pump, illustrating one embodiment of my invention. Fig. 2 is a similar view illustrating another embodiment of my invention. Fig. 3 is a top plan view of Fig. 1. Fig. 4 is an end view of the pump, a portion of the casing being removed. Fig. 5 is a sectional view of a bearing of the pump. Fig. 6 is a view of the suction end of the pump. Fig. 7 is a sectional view of the sleeve for securing the impellers to the shaft and of the means for packing the shaft where it passes through a partition in the casing. Fig. 8 is an end view of the sleeve for securing the impellers to the shaft. Fig. 9 is a sectional view showing the packing where the shaft passes out of the casing. Fig. 10 is a perspective view of the sleeve for securing the impellers to the shaft. Figs. 11 and 12 are enlarged views, in side elevation and longitudinal section, respectively, showing the adjustable rings in Fig. 1; and Figs. 13 and 14 are similar views showing the adjustable rings in Fig. 2.

The object of my invention has been to provide a means for balancing and removing the end thrust of a shaft of a centrifugal pump; and to such ends my invention consists in the means for balancing centrifugal pumps hereinafter specified.

In my patent for a centrifugal pump, No. 814,902, granted March 13, 1906, is illustrated a construction in which annular chambers similar to the chambers 15 and 16 in the present case are formed at each side of the impeller near the peripheries thereof between the impeller and the casing, and the walls of the passages into which the water leaving the impeller issues converge, so that the friction of such water and the centrifugal force imparted to the water clinging to the outer surfaces of the impeller cause the water to travel from the chambers 15 and 16 into the diffusing-passage 17. This action causes a decrease of pressure in the chambers 15 and 16, or what may be termed a "suction," and the amount of suction depends upon the size of the passages connecting such chambers with the diffusing-passage, the said suction being greater as such passages are smaller. The present invention is designed to afford means for regulating such passages. In the said patent the width of said passages is regulated by shifting the shaft and with it the impeller. In the present invention it is my purpose to avoid shifting the shaft and to enable these passages to be regulated for each impeller independently of the other.

In the present invention the surfaces 18 and 19, which converge, as before described, and which form the passages 20 and 21, before referred to, connecting the chambers 15 and 16 with the diffusing-passage 17, are formed on rings 22 and 23, the said rings being seated in annular grooves formed in the casing and a partition 24, respectively. In order to adjust the rings 22 and 23 without moving the shaft or the impeller, each ring has swiveled in it a rod 25, that is secured in the said ring by a screw 26, engaging the neck of the said rod mounted in the said ring. The rod has a threaded portion 27 that engages a threaded hole in a stuffing-sleeve 28, which is screwed into the casing and compresses the packing 29. By turning a handle 30 on the end of the rod the ring 22 may be forced toward the impeller or retracted into its seat. Each ring preferably has one of the rods 30 for each deflector 31 in the pump, each rod passing through one of the deflectors, so as not to interfere with the flow of the water.

Each impeller, as in the said patent, preferably carries rings 32 and 33, making a running contact with the casing and closing the inner or lower ends of the chambers 15 and 16. The static pressure on the front side of the impeller within the ring 33 is counterbalanced by the static pressure in the chamber 34, formed at the rear side of the impeller, the water passing from one side of the impeller to the other through the slots 35, formed in the sleeves, which secures the impellers to the shaft, as in the said patent.

In that embodiment of my invention illustrated in Figs. 2, 13, and 14 the construction is the same as that before described, except that instead of having the rings 22 and 19 mounted in annular grooves in the casing a ring 36 is provided having an integral spring-flange 37 formed thereon and secured to the casing by a screw 38. The ring 36 can be moved toward and from the impeller, owing to the elasticity of the flange 37, and yet the water is prevented from passing at the back of said ring.

In the operation of the above-described embodiment of my invention the end-thrust is balanced as follows: If there is a tendency of the shaft to move to the right, as seen in Fig. 1, the pressure in the chamber 15 is to be reduced. This is accomplished by moving the ring 22 nearer to the impeller, decreasing the passage-way between the two and causing a greater suction, and consequently a lesser pressure in the chamber 15. On the other hand, if there is a tendency of the shaft to move to the left, as seen in Fig. 1, the pressure in the chamber 16 is to be decreased, and its ring 23 is advanced by means of thumb-screws toward the impeller to make a more contracted passage-way between the two, and the water is exhausted from the chamber 16 until the pressures have been balanced.

Having thus described this invention, I claim—

1. In a centrifugal pump, the following combination of elements; a casing, an impeller running therein, a shaft, means movable to and from the walls of the casing whereby to enlarge and diminish, at will, the spaces between the means and the impeller whereby to vary the suction upon the fluid on either side of the impeller.

2. In a centrifugal pump, the following combination of elements; a casing, an impeller running therein, a shaft, means movable to and from the walls of the casing whereby to enlarge and decrease at will, the spaces between the means and the impeller whereby to vary the suction upon the fluid on either side of the impeller, and means to govern the shiftment of the means.

3. In a centrifugal pump, the following combination of elements: a casing, an impeller running therein, a shaft, means movable to and from the walls of the casing whereby to enlarge and diminish at will, the spaces between the means and the impeller whereby to vary the suction upon the fluid on either side of the impeller, means to govern the shiftment of the means, and securing devices to maintain the shiftment means in given positions.

4. In a centrifugal pump, the combination with a casing, of an impeller operating therein, the walls of said casing being provided with recesses, means located in said recesses, and means for shifting the first-named means to and fro in said recesses and to and from the face of the impeller whereby to vary the suction of the fluid on either side of the impeller.

5. In a centrifugal pump, the combination of a casing, a shaft, an impeller thereon, rotating within the casing, closed chambers formed in said casing at each side of the impeller, annular grooves formed in the casing at each side of the mouth of the impeller and outside of said chambers, rings mounted in said grooves, the adjacent faces of said rings converging toward each other, and means to shift said rings toward and from the impeller to vary the width of the communications between said chambers and the discharge of the impeller.

6. In a centrifugal pump, the combination of a casing, a shaft, an impeller thereon, rotating within the casing, closed chambers formed in said casing at each side of the impeller, annular grooves formed in the casing at each side of the mouth of the impeller and outside of said chambers, rings mounted in said grooves, the adjacent faces of said rings converging toward each other, and means to shift said rings toward and from the impeller to vary the width of the communications between said chambers and the discharge of the impeller, said means consisting of screw-rods swiveled to said rings and extending through the casing.

7. In a centrifugal pump, the combination of a casing, a shaft having bearings therein, an impeller mounted on the shaft, closed chambers formed in said casing at each side of the impeller, said casing having annular grooves at each side of the mouth of the impeller, and outside of said chambers, rings mounted in said grooves, the adjacent faces of said rings converging toward each other in the direction of the flow of the water from the impeller, rods mounted in the casing and having grooved heads that are seated in sockets in said rings, screws mounted in said rings and engaging said grooved heads, said rods having a screw-thread engaging a stationary part, and having means whereby they may be turned, whereby the width of the communications between said chambers and the discharge of the impeller may be varied.

JULIUS DEGEN.

Witnesses:
FRED. W. BARNACLO,
JOHN O. SEIFERT.